(12) United States Patent
Asikainen

(10) Patent No.: US 6,816,724 B1
(45) Date of Patent: Nov. 9, 2004

(54) APPARATUS, AND ASSOCIATED METHOD, FOR REMOTELY EFFECTUATING A TRANSACTION SERVICE

(75) Inventor: Jussi Asikainen, Tampere (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 09/473,291

(22) Filed: Dec. 28, 1999

(51) Int. Cl.[7] .............................................. H04M 3/42
(52) U.S. Cl. .................................. 455/414.1; 455/41.2
(58) Field of Search ............................. 455/466, 557, 455/558, 41, 414, 406, 41.1, 41.2, 566, 414.1; 705/34, 40

(56) References Cited

U.S. PATENT DOCUMENTS

| | | | |
|---|---|---|---|
| 5,887,266 A | * | 3/1999 | Heinonen et al. ............ 455/558 |
| 5,917,913 A | * | 6/1999 | Wang ........................... 308/25 |
| 5,983,208 A | * | 11/1999 | Haller et al. ................... 705/21 |
| 6,036,086 A | * | 3/2000 | Sizer, II et al. ............... 235/375 |
| 6,067,529 A | * | 5/2000 | Ray et al. ...................... 705/26 |
| 6,169,890 B1 | * | 1/2001 | Vatanen ........................ 455/406 |
| 6,195,542 B1 | * | 2/2001 | Griffith ......................... 455/406 |
| 6,311,042 B1 | * | 10/2001 | DeSchrijver ................. 455/556 |
| 6,327,300 B1 | * | 12/2001 | Souissi et al. ............... 375/219 |
| 6,405,027 B1 | * | 6/2002 | Bell ............................ 257/410 |
| 6,431,439 B1 | * | 8/2002 | Suer et al. ................... 235/380 |
| 6,574,314 B1 | * | 6/2003 | Martino .................... 379/93.17 |
| 2001/0014615 A1 | * | 8/2001 | Dahm et al. ................. 455/566 |

FOREIGN PATENT DOCUMENTS

| | | |
|---|---|---|
| WO | WO96/32702 | 10/1996 |
| WO | PCT/FI98/00250 | 10/1998 |
| WO | WO99/31630 | 6/1999 |

* cited by examiner

Primary Examiner—Quochien B. Vuong
Assistant Examiner—Tu Nguyen

(57) ABSTRACT

A set-top box is equipped with a television and a mobile terminal as well as a bank server connection all connected to each other via Internet, GSM networks, BlueTooth networks or the like. Users can request bank services via mobile phones. After security checks are completed, the user is granted permission to perform a selected banking service. The user can fill out a form or follow menu selection instructions to effectuate the desired service.

20 Claims, 5 Drawing Sheets

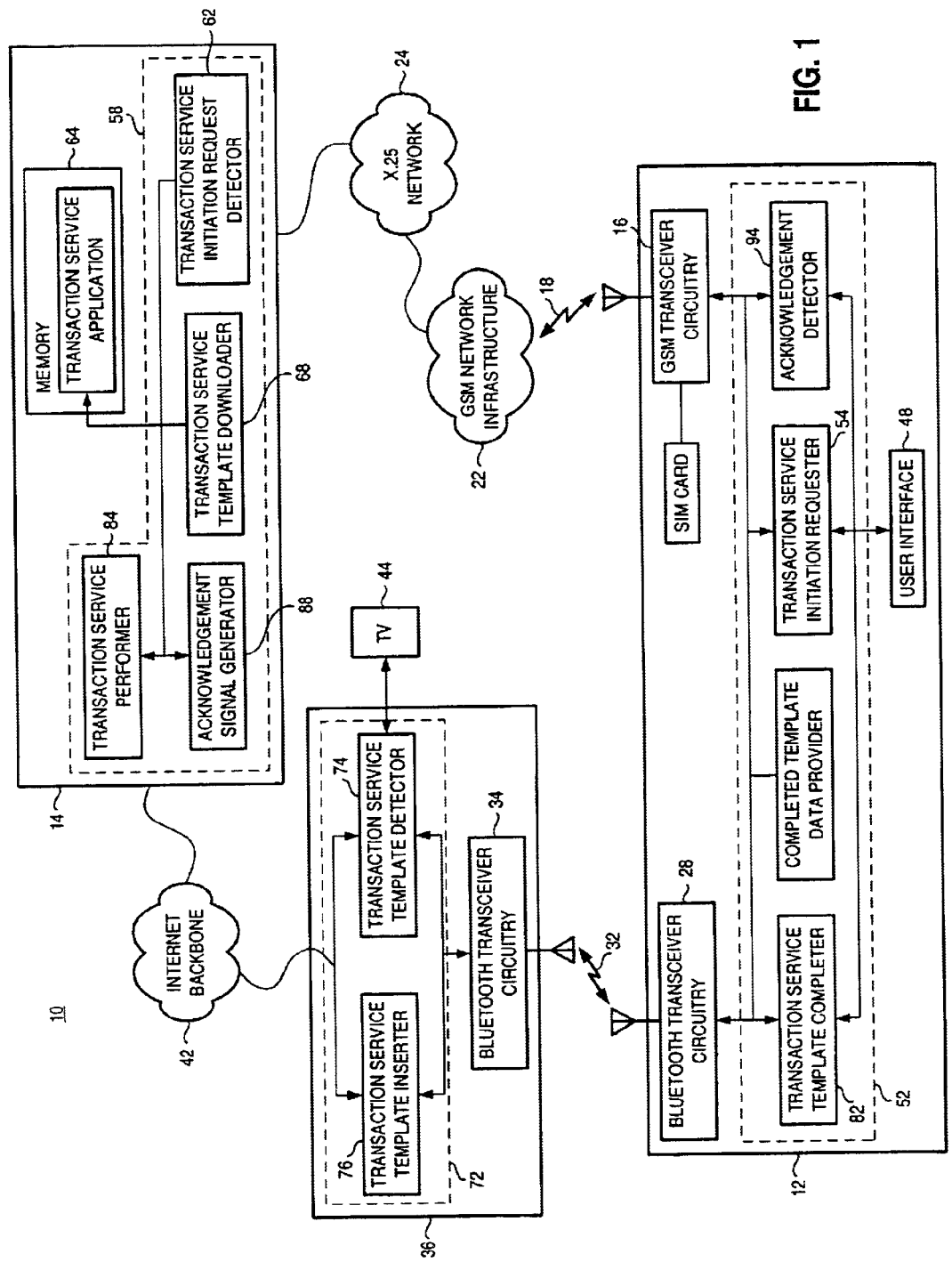

APPARATUS, AND ASSOCIATED METHOD, FOR REMOTELY EFFECTUATING A TRANSACTION SERVICE

FIELD OF THE INVENTION

The present invention relates generally to a manner by which remotely to effectuate performance of a transaction service, such as a banking transaction, through the use of a radio communication system. More particularly, the present invention relates to apparatus, and an associated method, for remotely effectuating performance of the transaction service from a mobile terminal.

BACKGROUND OF THE INVENTION

Various contemporary banking, and other transaction, services are used remotely by customers. Prior remote transaction services divide into two main groups, namely those utilizing the Internet and those utilizing Public Switched Telephone Networks (PSTN). For instance, a person having a personal computer (PC) connected to the Internet may establish a data connection to the server of the bank and take advantage of normal banking services. Examples include inquiries on account balances, inquiries as to last transactions, bill payments, etc.

The PC may be connected to the Internet via a modem, radio link, local area network (LAN), or the like. This introduces many problems such as PC configuration difficulties for an inexperienced operator, unreliable Internet connections, long delays because of data traffic jams, and high cost of necessary equipment as well as the cost of the Internet connection.

An alternative way of using remote banking services is to employ a conventional desktop phone connected to the PSTN. A user inserts the necessary information (bill reference, account numbers, passwords, amount of money, etc.) by use of the phone keypads. Keystrokes produce dual tone, multi-frequency (DTMF) signals which are interpreted by the tone recognition equipment at the bank.

The customer inserted information is further passed to the bank central computer which handles the desired transaction or transactions. The banking services utilizing DTMF phones are exposed to errors. For instance, it is quite difficult for a service user to control long sequences of inserted digits without seeing them simultaneously on a display. In addition, there are also some primitive banking services available for GSM phones as Short Message Service (SMS) services.

There have not been any major solutions to the aforementioned problems. For instance, the best solution other than higher speed modems to overcome heavy Internet traffic problems is apparently still to be usage of the banking services outside the business hours. New encryption algorithms and methods have developed which have improved the security of pure Internet banking services.

SUMMARY OF THE INVENTION

The present invention overcomes most of the problems present in conventional banking services as described above and provides a new process and system of managing and monitoring personal banking services. The architecture of the present invention can include a set-top box equipped with a television, a mobile terminal, and a server of a transaction service provider connected to each other via a network such as Internet, GSM and/or BlueTooth networks.

When a user requests a certain transaction, e.g. banking, service, a security check is initially performed. If the user is granted permission for the service requested, a corresponding template form is downloaded from the server of the transaction service provider onto the set-top box and displayed on a television screen. The user may fill out the form by taking advantage of a personal phone interface of the mobile terminal. The numeric data input by the user is then uploaded onto the server of the transaction service provider as a short message via a GSM network and the desired transaction may take place. Various implementation embodiments of the system architecture are possible to provide the best possible flexibility, stability, and the ability to adjust to the fluctuating network conditions.

The foregoing and other features, utilities and advantages of the invention will be apparent from the following more particular description of a preferred embodiment of the invention as illustrated in the accompanying drawings.

BRIEF DESCRIPTION OF THE DRAWINGS

FIG. 1 illustrates a functional block diagram of a communication system in which an embodiment of the present invention is operable.

DETAILED DESCRIPTION

Figure 2A:
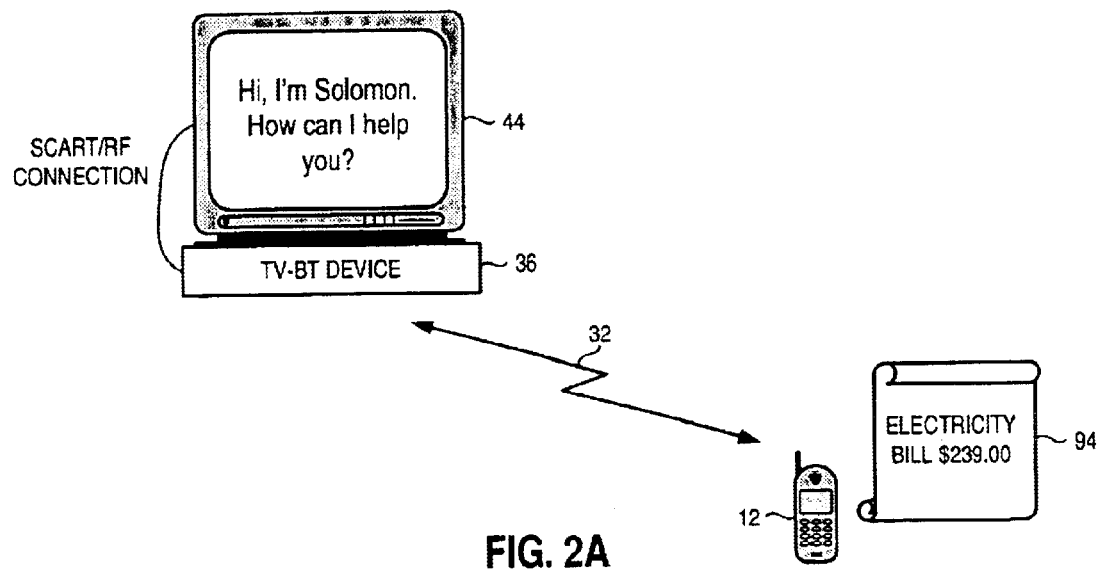
FIGS. 2A–2C illustrate pictorial representations of operation of an embodiment of the present invention.

Referring first to FIG. 1, a communication system, shown generally at 10, provides for wireless communications with a mobile terminal 12. The mobile terminal 12 is operable pursuant to an embodiment of the present invention to initiate effectuation of a service transaction by a remotely-positioned transaction service provider 14. In the exemplary implementation, the transaction service provider is formed of a computer server located at a banking facility, operable to perform banking services. While the following description of operation of an exemplary embodiment of the present invention shall be described with the performance of a banking service by the transaction service provider 14, in other implementations, operation of an embodiment of the present invention causes effectuation of other selected types of services.

The mobile terminal is operable pursuant to a multi-user radio communication system, here a GSM (Global System for Mobile communications) system. The mobile terminal 12 is here a WAP terminal and includes transceiver circuitry 16 operable to transceive communication signals generated on uplink and downlink channels of a radio link 18 defined by the appropriate GSM standards. GSM network infrastructure 22 is further shown to form a portion of the communication system 10 and is operable pursuant to, and includes elements set forth in the, appropriate GSM specification. In addition to circuit-switched communications, packet communications, such as packet data communications generated pursuant to short message services (SMS) are provided for pursuant to the GSM standards.

The infrastructure 22 is coupled to a packet data network, here an X.25 network 24. And, in turn, the transaction service provider 14 is also coupled to the X.25 network 24. Thereby, packets of data, such as those formatted into SMS messages, are communicated during operation of the communication system between the transaction service provider 14 and the mobile terminal 12 by way of the radio link 18, the network infrastructure 22, and the X.25 network 24.

The mobile terminal 12 also includes a BlueTooth transceiver 28 operable to transceive BlueTooth-formatted signals by way a radio link 32 with other BlueTooth devices, here, specifically, a BlueTooth transceiver 34 which forms a portion of a set-top box 36. When the mobile terminal 12 is positioned within the communication range permitted of BlueTooth signals, communication between the set-top box 36 and the mobile terminal 12 through the transmission of BlueTooth-formatted signals upon the radio link 32 is permitted. The set-top box 36 is coupled to a public, packet data network, here the Internet backbone 42. The transaction service provider 14 is also coupled to the Internet backbone 42. Thereby, suitably-formatted packets of data are able to be communicated between the transaction service provider and the set-top box 36.

The set-top box 36 is connected a video display device, here a conventional television, or the like, 44.

Operation of an embodiment of the present invention permits a user of the mobile terminal 12 to initiate effectuation of a transaction service by the transaction service provider. Advantage is taken of the characteristics of Blue-Tooth communications to facilitate the performance of the service in a cost-effective manner. Also, operation of an embodiment of the present invention further improves upon existing manners by which to remotely effectuate the performance of the transaction service by reducing the complexity of steps required to be taken by the user of the mobile terminal to provide information to the transaction service provider to permit the effectuation of the transaction service.

The mobile terminal 12 includes a user interface 48 through which the user of the mobile terminal initiates the request for the performance at the transaction service provider of a selected transaction service.

The mobile terminal 12 further includes a controller 52 operable to perform control functions to control operation of the mobile terminal. Functional elements shown to form a portion of the controller include a transaction service initiation requestor 54 operable responsive to user actuation of the user interface 48 to initiate the performance of a transaction service at the transaction service provider 14. The transaction service initiation requester is operable responsive to such actuation to cause the transceiver circuitry 16 to generate an SMS message representative of the request for initiation to be transmitted, by way of the radio link 18, the network infrastructure 22, and the x.25 network 24 to the transaction service provider 14. In one implementation, together with the initiation request message, an authentication message, or other security-type transmission, is generated and sent to the transaction service provider.

The transaction service provider also includes a controller, here controller 58, which includes a transaction service initiation request detector 62. The detector 62 is operable to detect reception at the transaction service provider of the requests generated by the mobile terminal and communicated to the service provider. If authentication or other security-type messages are required by the service provider, appropriate authentication procedures are carried out to ensure that the user of the mobile terminal is authorized to have the selected transaction service effectuated. If authorized, the detector retrieves, from a memory device 64, the selected transaction service, here forming an application, to perform the transaction service and an application forming a transaction service template, required to be completed by the user of the mobile terminal prior to performance of the selected transaction service.

The application associated with the selected transaction service template is provided to a transaction service template downloader 68. The downloader 68 downloads the application forming the selected transaction service template to the set-top box 36 by way of the Internet backbone 42.

The set-top box 36 includes a controller 72, here shown to include functional elements whose functions are carried out by the controller. The controller 72 is here shown to include a transaction service template detector 74 operable to detect downloading thereto of the application associated with the transaction service template. The transaction service template detector thereafter causes display of the selected service template upon the video screen of the television 44. When the user of the mobile terminal is positioned within viewing range of the television, the user is able to view the template. The template is an empty, or partially-empty, template. Values must be inserted into the template, and the template returned to the transaction service provider, so that the transaction service can be effectuated. Because of the BlueTooth communication capability of both the set-top box 36 and the mobile terminal 12, the values required to complete the template can be provided by the mobile terminal to the set-top box by way of the radio link 32.

The controller 52 of the mobile terminal also includes a transaction service template completer 75, here operable responsive to actuation of the user interface 48 by a user of the mobile terminal to generate the values required to complete the template displayed upon the video screen of the television 44. BlueTooth-formatted signals generated by the BlueTooth transceiver 28, of values selected by the user of the mobile terminal to complete the template, are transmitted upon the radio link 32 and provided to the BlueTooth transceiver 34 of the set-top box 36. The controller 72 also includes a transaction service template value inserter 76 operable to insert into the template the values contained in the BlueTooth signals transmitted the set-top box.

When the template is completed, a completed template data provider 82 of the controller 52 of the mobile terminal causes the template to be returned to the transaction service provider 14.

In the exemplary implementation, the completed template is provided to the mobile terminal by the sending of Blue-Tooth signals thereto by the set-top box. In turn, the provider 82 causes the GSM transceiver circuitry 16 to generate appropriate SMS signals which are sent to the transaction service provider. In another implementation, the completed template is caused, by the provider 82, to be returned to the transaction service provider by way of the Internet backbone 42. In one implementation, selection is made of the manner by which to return the template to the service provider dependent upon usage levels of the GSM network 22.

The transaction service provider also includes a transaction service performer 84 operable, responsive to receipt thereat of the values of the completed template, to effectuate the selected transaction service. And, the transaction service provider also includes an acknowledgment signal generator 88 for generating an acknowledgment of effectuation of the transaction service. In the exemplary implementation, the acknowledgment signal is routed to the mobile terminal in the form of a SMS message by way of the network 24, network infrastructure 22, and radio link 18. In another implementation, the acknowledgment is provided to the mobile terminal by way of the Internet backbone 42, the set-top box 36, and the radio link 32. The mobile terminal includes an acknowledgment detector 94 operable to detect reception at the mobile terminal of the acknowledgment generated by the transaction service provider. Detection by the detector 94 is displayable at the user interface 48 to inform the user of the mobile terminal of completion of the transaction service.

In one exemplary implementation, when a user of the mobile terminal 12 wants to have a transaction service performed, appropriate actuation keys of the user interface 48 are actuated, causing the mobile terminal to generate an SMS message.

When the SMS message is detected at the transaction service provider 14, the service provider identifies the user, and whereafter the appropriate application and, e.g., invoice form is downloaded to the set-top box 36 via the Internet backbone 42.

The user of the mobile terminal connects with the set-top box 36 via a BlueTooth link, by inputting a password, for example, and whereafter the user is able to scan account information and fill, e.g., fields of the invoice form via the mobile terminal.

The user then causes the information filled in the form to be sent to the service provider 14 in the form of an SMS message. Once received at the service provider, the information is checked and accepted, i.e., acknowledged, by another SMS message.

Operation of an embodiment of the present invention thereby provides a manner by which to initiate effectuation of a transaction service remotely. From the perspective of a user of the mobile terminal, steps required to effectuate the transaction service are simplified relative to existing manners by which transaction services are remotely effectuated. Long sequences of DTMF tones are not necessary to be entered to effectuate performance of the transaction service. Instead, a more intuitive manner, making use of a visual display upon the television 44, is provided by which to enter the data required for the performance of the transaction service. Also, cost-effective communications are provided through the use of BlueTooth technology. Usage of a commercial, radio communication system is thereby reduced.

When the transaction service provider is formed of a banking service provider, a user requests a banking service by sending a short message using the mobile terminal 12, for instance, to the bank server 14 via GSM network 22. The bank server 14 is able to take dynamic advantage of both GSM and Internet connections. The message may include data for service identification as well as for user authentication. It is possible to increase the level of security by sending extra information specific to the mobile terminal 12. For example, this extra security information might take the form of a security code stored in the subscriber identity module or SIM-card of the mobile terminal.

Assuming the security check is cleared, a template form such, as a bill, for instance, corresponding to the requested service is downloaded from the bank server 14 onto the set-top box 36 via Internet 42. The form is displayed on the television screen 44 connected to the set-top box 36.

To ensure adequate security, the set-top box 36 application responsible for the banking services prompts for another password before the transactions of personal accounts are browsed by the user. The blanks of the downloaded bill form (such as reference number, amount of money, account number, etc.) may be then input utilizing the mobile terminal 12 connected to the set-top box 36 via a BlueTooth-type radio link 32.

Once the form is filled out completely, the necessary data needed to pay the bill may be sent further to the bank server 14 via GSM network 22. Data is sent in the form of short messages. This way, the mobile terminal may function off-line with regard to the GSM network 22 connection.

The set-top box 36 bank application runs some local tests such as checking out the syntax of the filled bill form or whether the balance of the specific account covers the total of the bill(s) or not before it lets the user send the bill information any further. The bank server 14 carries out the requested transaction, paying the bill in this case.

When the transaction was successful, the user and the set-top box 36 application are notified with an acknowledge message via the Internet 42. The user may close the service now or request another type of service. Otherwise the user must correct the form information into an appropriate format and re-send it to the bank server 14 as long as the bill payment data is accepted.

The user has the option of saving the information about the bank account transactions for a predetermined period of time such as a month, including the transactions that took place in the present session. This way it is possible to view account transactions in an off-line mode with almost no cost. Furthermore, information concerning regularly recurring bills can be saved to ease the next payment.

The method of this invention overcomes or at least reduces most of the problems mentioned above herein. Because of utilization of wireless BlueTooth control with mobile terminal 12, the service user may for instance sit in the living room or anywhere within a GSM coverage area, and view the transactions of his/her accounts on television screen 44. Compared to conventional desk top phones, it is far easier for the user to keep up with inserted information for the bill since one may continuously view/modify the information with the mobile terminal. It is also possible to view past account transactions in off-line mode completely free of charge.

The system in accordance with an embodiment of the present invention provides alternatives for unstable Internet connections. Sophisticated server/client applications may also speed up the service by utilizing the connections (Internet, GSM) in various ways to balance the traffic jams (or even connection charges) in both networks. For example, if GSM SMS service is overloaded with heavy traffic, the bank server may use Internet as an uplink channel as well. Furthermore, the security of the bank services is improved since data delivery needed in services is distributed into two completely different channels.

The system of an embodiment of the present invention may be implemented in various ways as discussed earlier. It is possible to use both connection channels dynamically to adjust to current network conditions and prices. The concept allows development of most versatile new banking services such as stock exchange, credit card payment inquiries, investment services, monitoring of loans and interest rates, etc. Additionally, the concept may be modified by replacing the Internet with some broadcasting transfer media such as digital audio broadcasting (DAB), satellite or cable.

A typical implementation of the method in accordance with an embodiment of the present invention for paying a bill is illustrated in FIG. 2A-2. Assume the user has received an electric bill 94 for $XXX.XX which the user wants to pay. The user clicks the mobile phone 12 and awakes the set-top box 36 via BlueTooth connection 32. The set-top box 36 is connected to a television type display 44 via a SCART/RF connection. The display 44 begins to prompt the user, as indicated in FIG. 2A, such as by displaying, "Hi. I am Solomon. How can I help you?"

Figure 2B:
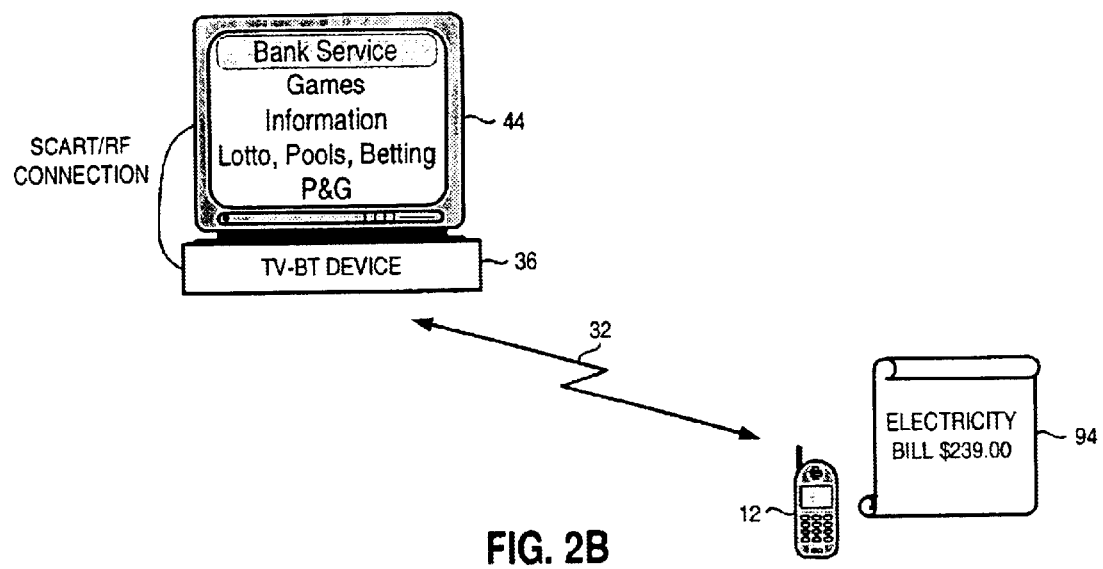

The display 44 can present a menu, as indicated in FIG. 2B, of a series of options the user can select. This series of options might include, and as shown in FIG. 2, "1. Bank Services. 2. Games, 3. Lotto/pools/betting, and 4. P&G." The user selects bank services since the user want to pay the electric bill. The display might next present a series of possible services such as phone bill payment, insurance bill payment, electricity bill payment, etc. The user chooses the accounts from memory of the set-top box 36. The user then inputs the sum and reference number followed by sending of the paying order.

Figure 2C:
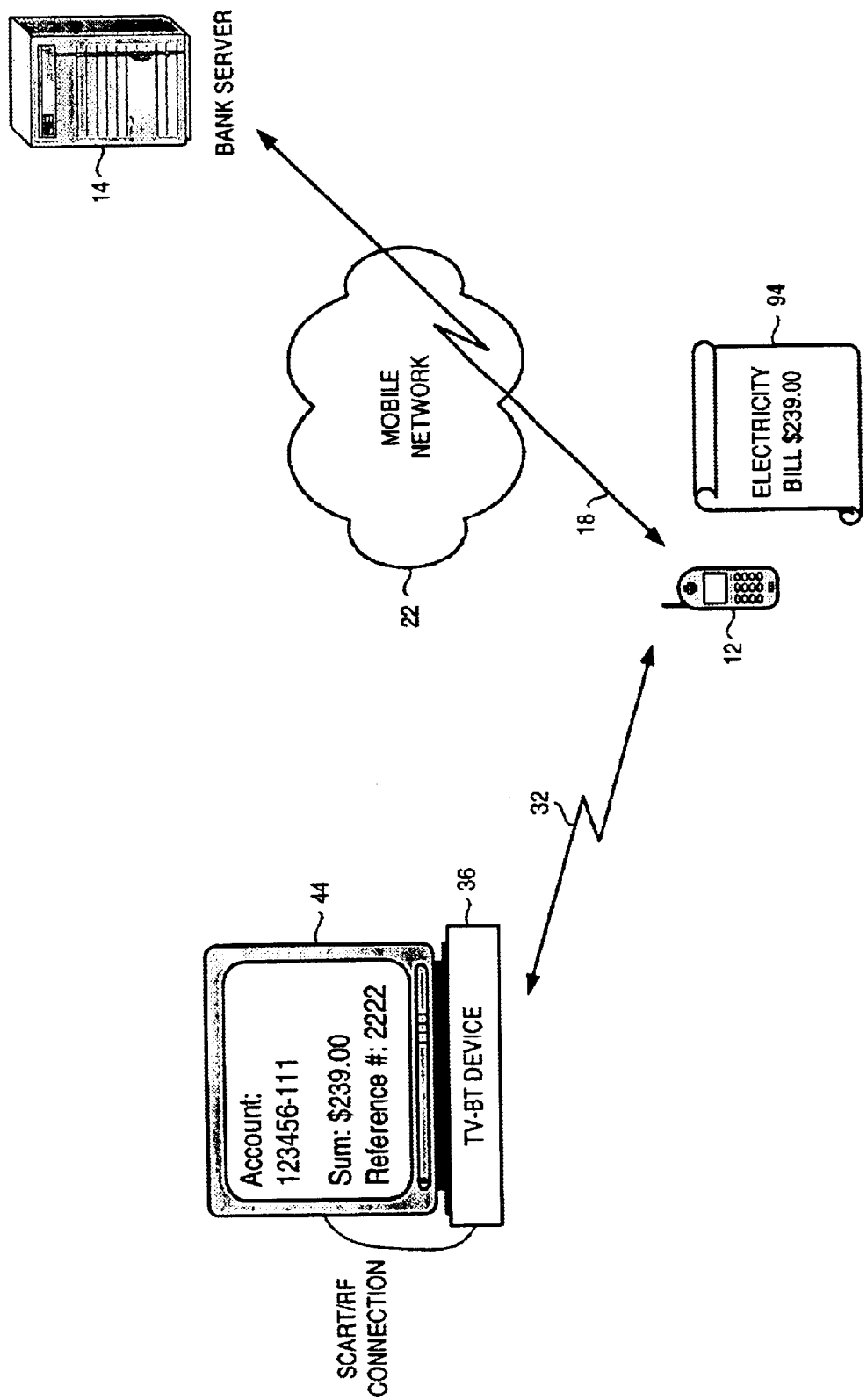

As indicated in FIG. 2C, the bank server 14 is notified of this input from the set-top box 36. It establishes a connection over the mobile network 22 requiring proper identification from the mobile terminal 12. The server 14 can then direct the set-top box 36 to cause display 44 to indicate the completion of the payment transaction.

The implementation embodiment described is preferred at the present because most servers and client software support Internet protocols instead of others. The method in accordance with this invention is easier to integrate and test into existing bank servers and set-top boxes.

Figure 3:
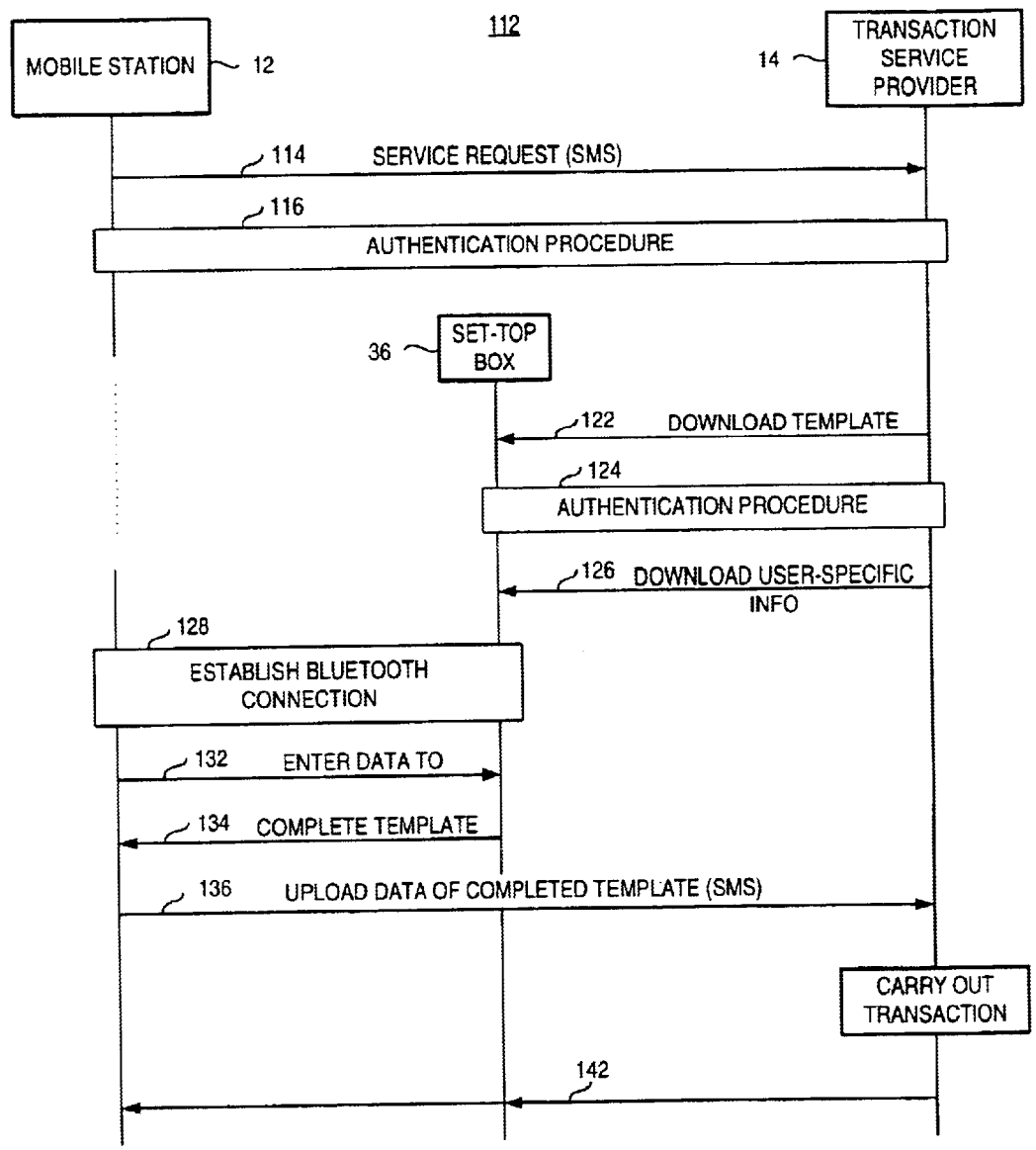
FIG. 3 illustrates a message sequence diagram showing the sequence of messages generated during operation of an embodiment of the present invention.

FIG. 3 illustrates a message sequence diagram, shown generally at 112, showing the sequence of messages generated during exemplary operation of an embodiment of the present invention. Operation of an embodiment of the present invention permits remote effectuation, by way of a mobile terminal, of a transaction service, such as a banking service. A user of the mobile terminal is able to conveniently, and from the perspective of the user, easily enter required data needed by a transaction service provider to perform the transaction service.

When a user of the mobile terminal elects to initiate effectuation of a transaction service, selected actuation of actuation keys of the mobile terminal by the user causes the mobile terminal to generate a service request, here indicated by the segment 114. The service request in the exemplary implementation is formed of an SMS message which is sent to a server located at the transaction service provider.

Then, and as indicated by the block 116, authentication procedures are carried out to ensure that the mobile terminal is authorized to request the effectuation of the transaction service. In one implementation, a security message, containing values retrieved from a SIM card of the mobile terminal is sent to the transaction service provider.

Once the mobile terminal has been authenticated, the transaction service provider downloads, indicated by the segment 122, a transaction service template to the set-top box 36. And, as indicated by the block 124, additional security or authentication procedures are carried out. Once the set-top box is authenticated, user-specific information is downloaded, indicated by the segment 126, to the set-top box. The user is also able to scan the data, pursuant to the service. The template is displayed at a video display device, such as the television 44 (shown in FIG. 1). Then, and as indicated by the block 128, a BlueTooth connection is established between the BlueTooth transceiver of the set-top box 36 and the BlueTooth transceiver of the mobile terminal 12. Once the BlueTooth connection is established, the user of the mobile terminal is able to enter data upon the template displayed at the video terminal connected to the set-top box 36. Entry of data by way of a. BlueTooth connection is indicated by the segment 132 in the figure. Once the template is completed, in the exemplary implementation, values of the completed template are sent, indicated by the segment 134, to the mobile terminal. The mobile terminal, in turn, uploads the data of the completed template in the form of one or more SMS messages, indicated by the segment 136, to the transaction service provider.

When received at the transaction service provider, the transaction service is carried out, indicated by the block 138. Then, and as indicated by the segment 142, an acknowledgment is provided to the mobile terminal, here also in the form of a SMS message, indicated by the segment 142.

Figure 4:
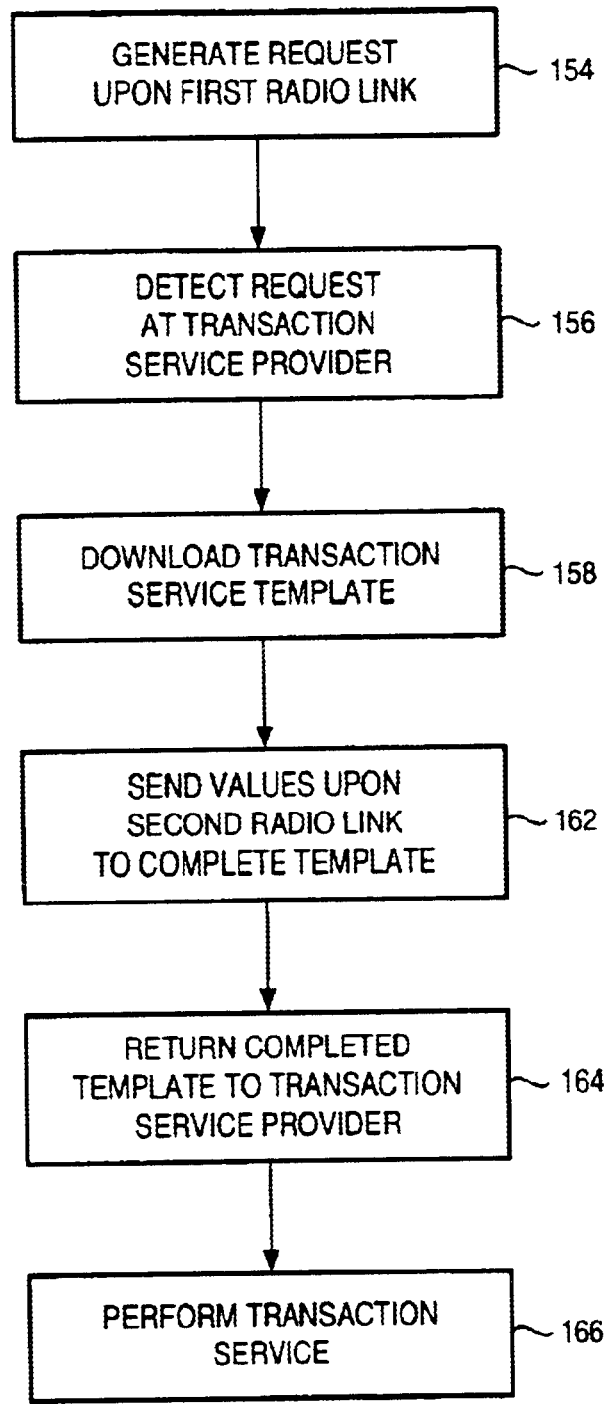
FIG. 4 illustrates a method flow diagram of the method of operation of an embodiment of the present invention.

FIG. 4 illustrates a method, shown generally at 152, listing the method steps of the method of operation of an embodiment of the present invention. The method facilitates effectuation of a selected transaction service in a communication system. The communication system includes a mobile terminal operable to communicate by way of a first radio link and a mobile network with a transaction service provider. The mobile terminal is also operable to communicate with a communication station by way of a second radio link. The transaction service provider and the communication station are coupled together by way of a communication network.

First, and as indicated by the block 154, a request is generated upon the first radio link for the performance at the transaction service provider of a transaction service. Then, and as indicated by the block 156, the request is detected at the transaction service provider.

Thereafter, and as indicated by the block 158, a transaction service template is downloaded by the transaction service provider to the communication station. Values are then sent, as indicated by the block 162, by the mobile terminal upon the second radio link to the communication station, thereby to complete the transaction service template downloaded to the communication station.

Thereafter, and as indicated by the block 164, the transaction service template, once completed, is returned to the transaction service provider. And, as indicated by the block 166, the selected transaction service is performed at the transaction service provider.

Thereby, a manner is provided by which to permit a user of a mobile terminal to effectuate the performance of a transaction service at a remote location.

The previous descriptions are of preferred examples for implementing the invention, and the scope of the invention should not necessarily be limited by this description. The scope of the present invention is defined by the following claims:

What is claimed is:

1. In a communication system having a mobile terminal operable to communicate by way of a first radio link and a mobile network with a transaction service provider, and further operable to communicate with a communication station by way of a second radio link, wherein the transaction service provider and the communication station are coupled together by way of a communication network, an improvement of apparatus for the mobile terminal for facilitating effectuation of a selected transaction service, said apparatus comprising:

first transceiver circuitry operable to transmit and receive communication signals over the first radio link;

second transceiver circuitry operable to transmit and receive communication signals over the second radio link using a short-range communication protocol;

a transaction service initiation requestor coupled to the first transceiver circuitry and operable responsive to user actuation thereof to generate a service-initiation request; for communication to the transaction service provider by way of the first radio link, the service-initiation request requesting performance of a selected transaction service;

a transaction service template completer coupled to the second transceiver circuitry and operable responsive to user actuation thereof to provide transaction values from the mobile terminal to the communication station for completing by way of the second radio link, a transaction service template that has been downloaded from the transaction service provider to the communication station; and a transaction data provider coupled to the first transceiver circuitry and operable, for providing indications of the completed transaction values from the mobile terminal to the transaction service provider by way of the first radio link and the mobile network.

2. The apparatus of claim 1 wherein the service-initiation request generated by said transaction service initiation requestor further comprises an authentication message for authenticating the mobile terminal of which said transaction service initiation requester forms a portion.

3. The apparatus of claim 2 wherein the mobile network comprises a GSM (Global System for Mobile communications) network, wherein the mobile terminal comprises a GSM-compatible mobile terminal containing a SIM (Subscriber Identity Module)-card, and wherein the authentication message comprises data stored in, and retrieved from the SIM-card.

4. The apparatus of claim 1 wherein the mobile network comprises a GSM (Global System for Mobile communication) network that provides for SMS (short message service) messaging and wherein the service-initiation request generated by said transaction service initiation requestor comprises an SMS message.

5. The apparatus of claim 1 wherein the transaction service template downloaded from the transaction service provider to the communication station is downloaded by way of the communication network, wherein the communication station comprises a video display element and a first BlueTooth-compatible transceiver, wherein the mobile terminal further comprises a second BlueTooth-compatible transceiver, and wherein the transaction values communicated between said transaction service template completer and the communication station to complete the transaction service template comprise BlueTooth signals communicated between the first and second BlueTooth-compatible transceivers, respectively.

6. The apparatus of claim 1 wherein the mobile network comprises a GSM (Global System for Mobile communications) network capable of SMS (Short Message Service) messaging, wherein the mobile terminal comprises a GSM-compatible mobile terminal, and wherein the indications of the completed transaction values provided by the mobile terminal to the transaction service provider comprise an SMS message.

7. The apparatus of claim 1 wherein the communication network by which the communication station and the transaction service provider are coupled comprises a packet-data network and wherein the indications of the completed transaction values provided by said transaction data provider to the transaction service provider are sent by way of the second radio link, the communication station, and the packet data network.

8. The apparatus of claim 1 further comprising an acknowledgment detector coupled to receive acknowledgments generated by the transaction service provider acknowledging performance of the selected transaction service.

9. In the communication system of claim 1, a further improvement of apparatus for the communication station for facilitating effectuation of the selected transaction service, said apparatus comprising:

a transaction service template detector and displayer for detecting downloading of the transaction service template to the communication station from the transaction service provider and for displaying the transaction service template once downloaded thereto.

10. The apparatus for the communication station of claim 9 further comprising a transaction service template value inserter coupled to receive the service template values provided by said transaction service template completer, said transaction service template value inserter for inserting the service template values into the displayed transaction service template.

11. The apparatus for the communication station of claim 10 wherein said transaction service template value inserter further provides the transaction service template, once completed pursuant to operation of said transaction service template completer and said transaction service template value inserter, to said transaction data provider.

12. The apparatus of claim 10 wherein said transaction service template value inserter is further selectably operable, responsive to said transaction data provider, to provide the indications of the transaction service template to the transaction service provider by way of the communication network.

13. In the communication system of claim 1, a further improvement of apparatus for the transaction service provider for facilitating effectuation of the selected transaction service, said apparatus comprising:

a service-initiation request detector coupled to receive indications of a service-initiation request generated by said service-initiation requester, said service-initiation detector for detecting reception of the service-initiation request at the transaction service provider and for generating the transaction service template responsive thereto.

14. The apparatus for the transaction service provider of claim 13 wherein the transaction service provider further comprises a memory device at which the transaction service template is stored and wherein said service-initiation detector generates the transaction service template by retrieving the transaction service template from the memory device.

15. The apparatus for the transaction service provider of claim 13 further comprising a transaction service template downloader for downloading the transaction service template generated by said service-initiation request detector to the communication station.

16. The apparatus for the transaction service provider of claim 13 further comprising a transaction service performer for performing the selected transaction service responsive to providing of the transaction data, once completed, to the transaction service provider.

17. The apparatus for the transaction service provider of claim 16 further comprising an acknowledgment generator coupled to said transaction service performer, said acknowledgment generator for generating an acknowledgment for transmission to the mobile terminal acknowledging performance of the selected transaction service by said transaction service performer.

18. In a method for communicating in a communication system having a mobile terminal operable to communicate by way of a first radio link and a mobile network with a transaction service provider, and further operable to communicate with a communication station by way of a second radio link using a short-range communication protocol, wherein the transaction service provider and the communication station coupled together by way of a communication network, and improvement of a method for facilitating effectuation of a selected transaction service, said method comprising:

generating a service-initiation request at the mobile terminal to request performance of a selected transaction service by a transaction service provider;

transmitting the service-initiation request to the transaction service provider by way of the first radio link and the mobile network;

detecting at the transaction service provider the service-initiation request generated during said operation of generating;

downloading a transaction service template to the communication station by way of the communication network responsive to detecting the service-initiation request;

receiving user-entered transaction values in the mobile terminal;

communicating the transaction values from the mobile terminal to the communication station by way of the second radio link to complete the downloaded transaction service template;

returning, by the mobile station, the completed transaction values to the transaction service provider by way of the first radio link and the mobile network; and performing the selected transaction service by making use of transaction values returned to the transaction service provider during said operation of returning.

19. In a communication system having a mobile terminal operable to communicate by way of a first radio link and a mobile network with a transaction service provider, and operable to communicate with a communication station by way of a second radio link, wherein the transaction service provider and the communication station are coupled together by way of a communication network, an improvement of apparatus for the communication station for facilitating effectuation of a selected transaction service, said apparatus comprising:

a transaction service template detector and displayer for detecting downloading of a transaction service template to the communication station by the transaction service provider in response to a service initiation request transmitted from the mobile terminal to the transaction service provider by way of the first radio link, for displaying the downloaded transaction service template, and for displaying transaction values provided by the mobile station by way of the second radio link prior to facilitate entry of the transaction values for subsequent transmission from the mobile station to the transaction service provider via the first radio link.

20. In a communication system having a mobile terminal operable to communicate by way of a first radio link and a mobile network with a transaction service provider, and further operable to communicate with a communication station by way of a second radio link using a short-range communication protocol, wherein the transaction service provider and the communication station are coupled together by way of a communication network, an improvement of apparatus for the transaction service provider for facilitating effectuation of a selected transaction service, said apparatus comprising:

a service-initiation request detector coupled to receive indications of a service-initiation request communicated from the mobile terminal by way of the first radio link, said service-initiation detector for detecting reception of the service-initiation request at the transaction service provider and for generating a transaction service template responsive thereto;

wherein the transaction service template is for transmission to the communication station for display thereat for facilitating the entering of the transaction values at the mobile terminal prior to transmitting them; and a transaction values detector for detecting transaction values corresponding to the transaction service template and transmitted by the mobile terminal via the first radio link.

\* \* \* \* \*